(12) United States Patent
Ke

(10) Patent No.: US 7,379,295 B2
(45) Date of Patent: May 27, 2008

(54) ONE-TOUCH RELEASE APPARATUS

(75) Inventor: Fa-Chih Ke, Taipei (TW)

(73) Assignee: Arima Computer Corporation, Taipei (TW)

( * ) Notice: Subject to any disclaimer, the term of this patent is extended or adjusted under 35 U.S.C. 154(b) by 1322 days.

(21) Appl. No.: 10/409,936

(22) Filed: Apr. 9, 2003

(65) Prior Publication Data

US 2004/0201601 A1 Oct. 14, 2004

(51) Int. Cl.
*G06F 1/16* (2006.01)

(52) U.S. Cl. .............. 361/686; 710/303; 248/346.01; 715/700

(58) Field of Classification Search .............. 361/686; 248/346.01; 715/700
See application file for complete search history.

(56) References Cited

U.S. PATENT DOCUMENTS

| | | | | |
|---|---|---|---|---|
| 5,030,128 A * | 7/1991 | Herron et al. | .............. | 439/372 |
| 5,619,398 A * | 4/1997 | Harrison et al. | ............ | 361/686 |
| 5,870,283 A * | 2/1999 | Maeda et al. | ............... | 361/686 |
| 6,061,233 A * | 5/2000 | Jung | ........................... | 361/686 |
| 6,119,184 A * | 9/2000 | Takahama | .................... | 710/303 |
| 6,135,801 A * | 10/2000 | Helot et al. | ................. | 439/341 |
| 6,264,488 B1 * | 7/2001 | Helot et al. | ................. | 439/341 |
| 6,522,533 B1 * | 2/2003 | Ikeuchi et al. | .............. | 361/686 |
| 6,533,599 B1 * | 3/2003 | Singleton, Jr. | ............. | 439/347 |
| 6,741,462 B2 * | 5/2004 | Kamphuis et al. | ......... | 361/686 |
| 6,744,627 B2 * | 6/2004 | Won et al. | ................... | 361/686 |
| 6,757,166 B2 * | 6/2004 | DeLuga et al. | ............ | 361/686 |
| 6,898,079 B2 * | 5/2005 | Park | ........................... | 361/686 |

* cited by examiner

*Primary Examiner*—Lisa Lea-Edmonds
(74) *Attorney, Agent, or Firm*—Sutherland Asbill & Brennan, LLP

(57) ABSTRACT

An apparatus controlled by one touch operation for releasing and propping components is disclosed. The apparatus includes a base, a prop device with a resilient piece and an ejecting pin, a reciprocating device located between the base and the prop device, and a stabilizing device fixed on the base. The reciprocating device includes a reciprocating piece and a reciprocating base fixed on the reciprocating piece. The stabilizing device includes a stabilizing base and a movable latch connected to the prop device for limiting the ejecting pin of the prop device.

19 Claims, 7 Drawing Sheets

ONE-TOUCH RELEASE APPARATUS

FIELD OF THE INVENTION

This invention relates to an apparatus, disposed in a housing of a computer, for use in disassembling peripheral devices from a computer by one touch operation, and especially to a port replicator for being disassembled from a notebook PC by one touch operation.

BACKGROUND OF THE INVENTION

A design for optionally changing the components of an apparatus by the user's individual opinion can increase the use scopes and the varieties of the functions of the apparatus effectively. They are popular designs such as changing the geometrical structures of a mobile latch and achieving the effects of releasing and ejecting by a spring. The designs had been applied in different fields, such as the fabricated toys, fabricated models, and the peripherals of computers. Because some components of the apparatus may be heavy, it's a focal point to provide a design with enough support abilities and easy-separated structures.

Nowadays, in the design field about a notebook PC, for improving the portability ability and simplifying the structure of the notebook PC, the varieties and numbers of the connecting ports are not as great as a traditional desktop computer. Besides, the universal serial bus had gradually displaced the traditional parallel ports and serial ports in the connecting ports of a notebook PC. However, the connecting ports of the traditional peripherals of computers such as the monitors, printers, modems, scanners, and joysticks may be still parallel ports or serial ports. Therefore, a port replicator is used for connecting a notebook PC to the traditional peripherals. An ideal port replicator not only provides greater expanded abilities and expanded selectiveness for a notebook PC but also simplifies the procedures of rearrangements of the peripherals.

In general, a notebook PC usually possesses a "docking" for connecting to an external port replicator. The capabilities of a notebook PC will be as great as a desktop computer while connecting to a port replicator. A number of strength appears in the connection between the docking and the port replicator. Because of the self-weight of a notebook PC and the strength of the connection, a port replicator usually has particular designs for supporting and stabilizing while disassembling. However, designs simultaneously own the abilities of supporting, stabilizing, releasing, and ejecting are still deficient. In general, the mechanisms for releasing and ejecting are controlled by different operative devices, such as keys. Once the operative devices can't be worked simultaneously or are operated imbalanced, it would be difficult to disassemble the notebook PC from the port replicator even cannot be disassembled. In addition, the mechanisms for releasing and ejecting are always achieved by springs. The elasticity of a spring decays as time goes, so that it is possible that the notebook PC will not be released and rejected from the port replicator.

Because of the technical defects described above, the applicant keeps on carving unflaggingly to develop "ONE-TOUCH RELEASE APPARATUS" through wholehearted experience and research.

SUMMARY OF THE INVENTION

It is an object of the present invention to provide a design for easily rearranging the components of an apparatus by one touch operation. With the design, the user can rearrange the components of the apparatus depending on personal options and increase the application scopes of the apparatus.

It is another object of the present invention to provide a design with the particular geometric structures of inclines and tracks, and rigidities of materials to achieve releasing and ejecting a notebook PC from a port replicator.

In accordance with another aspect of the present invention, a release apparatus controlled by one touch operation is provided. The apparatus includes a base, a prop device having a resilient member located between the base and an ejecting pin, a reciprocating device located between the base and the prop device and having a reciprocating piece and a reciprocating base fixed on the reciprocating piece, and a stabilizing device fixed on the base and having a stabilizing base and a movable piece for limiting the ejecting pin of the prop device.

Preferably, the base includes a plurality of protruding pillars having different lengths and a plurality of protruding lumps for limiting the reciprocating device to be moved in a moving track.

Preferably, the movable piece is a movable latch and the ejecting pin has a holder for limiting the movable latch.

Preferably, the movable latch further includes a latch end connected to the ejecting pin, and a stabilizing end located between the roller and a latch spring inside the stabilizing base.

Preferably, the apparatus further includes at least a reciprocating spring connected to the reciprocating piece, a roller located on a pair of inclined roller tracks on the stabilizing base, and a key for bearing the one touch.

Preferably, the key is moved by the one touch for producing a first key displacement and a second key displacement respectively so as to move the reciprocating base and produce a first reciprocating base displacement and a second reciprocating base displacement at the same direction correspondingly.

Preferably, the reciprocating base further includes two symmetrical portions, and each of the two symmetrical portions has a track, a roller notch, a first incline located between the roller notch and a first reciprocating plane thereof, and a second incline connected to a second reciprocating plane thereof.

Preferably, the ejecting pin is moved along the second incline to the second reciprocating plane during the second reciprocating base displacement.

Preferably, the roller notch includes a first stopping plane, a second stopping plane, and a holding plane.

Preferably, the roller is pushed by the first stopping plane so as to be moved in the roller track and produce a roller displacement during the first reciprocating base displacement.

Preferably, the movable latch is moved by the roller during the roller displacement so as to produce a first latch displacement simultaneously.

Preferably, the resilient member is an ejecting spring and the ejecting pin is pushed up by the ejecting spring after the first latch displacement.

Preferably, the stabilizing base further includes a beam with a hole and the hole is passed through by the ejecting pin.

Preferably, the stabilizing base further includes a rigid cover for limiting a moving scope of the movable piece.

The other object of the present invention is to provide a port replicator controlled by one touch operation for releasing and ejecting a notebook PC. The port replicator includes a base having a plurality of prop devices, a reciprocating piece being located between the base and the plurality of prop devices and including a plurality of reciprocating bases, a plurality of stabilizing devices fixed on the base, a plurality of conducting terminals located on the base respectively, and a removable cover combined on the base corresponding to positions of the plurality of prop devices and the plurality of conducting terminals for carrying thereon a notebook PC. Each of the plurality of prop devices has a holder and is connected to the base via a spring. Each of the plurality of reciprocating bases has at least a reciprocating plane. Each of the plurality of stabilizing devices respectively includes a movable piece for limiting the holder.

Preferably, the movable piece is a movable latch with a latch end and a stabilizing end.

Preferably, the latch end and the holder are engaged with each other.

Preferably, the reciprocating plane supports the ejecting pin while the ejecting pin being on the reciprocating plane.

Preferably, the movable piece is a stair-shaped latch.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1:
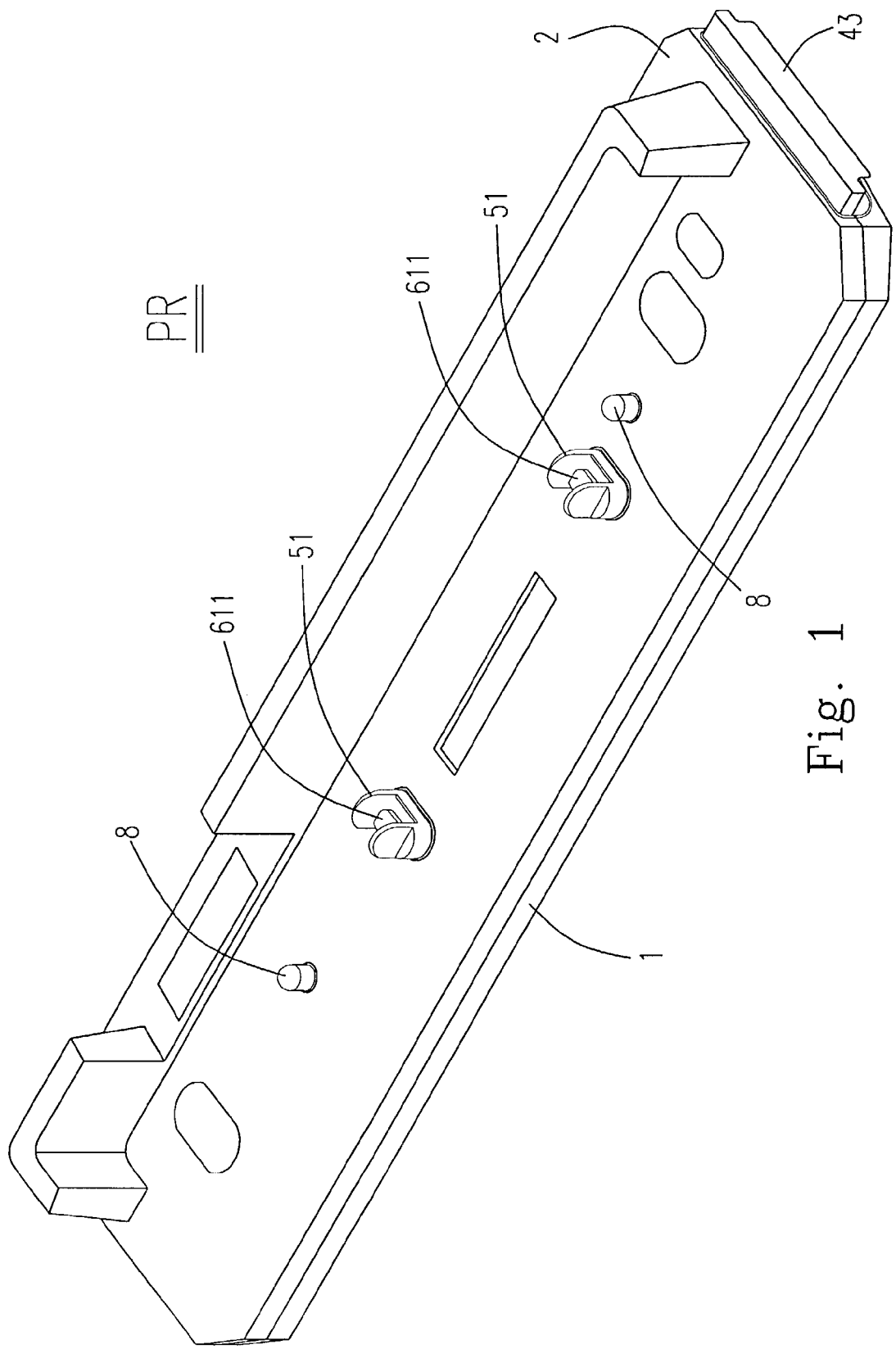
FIG. 1 shows the appearance of the port replicator with the abilities of releasing and ejecting controlled by one touch operation according to a preferred embodiment of the present invention.

Please refer to FIG. 1 showing the appearance of the port replicator of the present invention. As shown in FIG. 1, a port replicator PR includes a base 1, a removable cover 2, two conducting terminals 8, two ejecting pins 51, two latch ends 611, and the key 43. Wherein the conducting terminal 8, the ejecting pin 51, and the latch end 611 are protruded from the removable cover 2, and the key 43 is located at one side of the port replicator PR.

Figure 2:
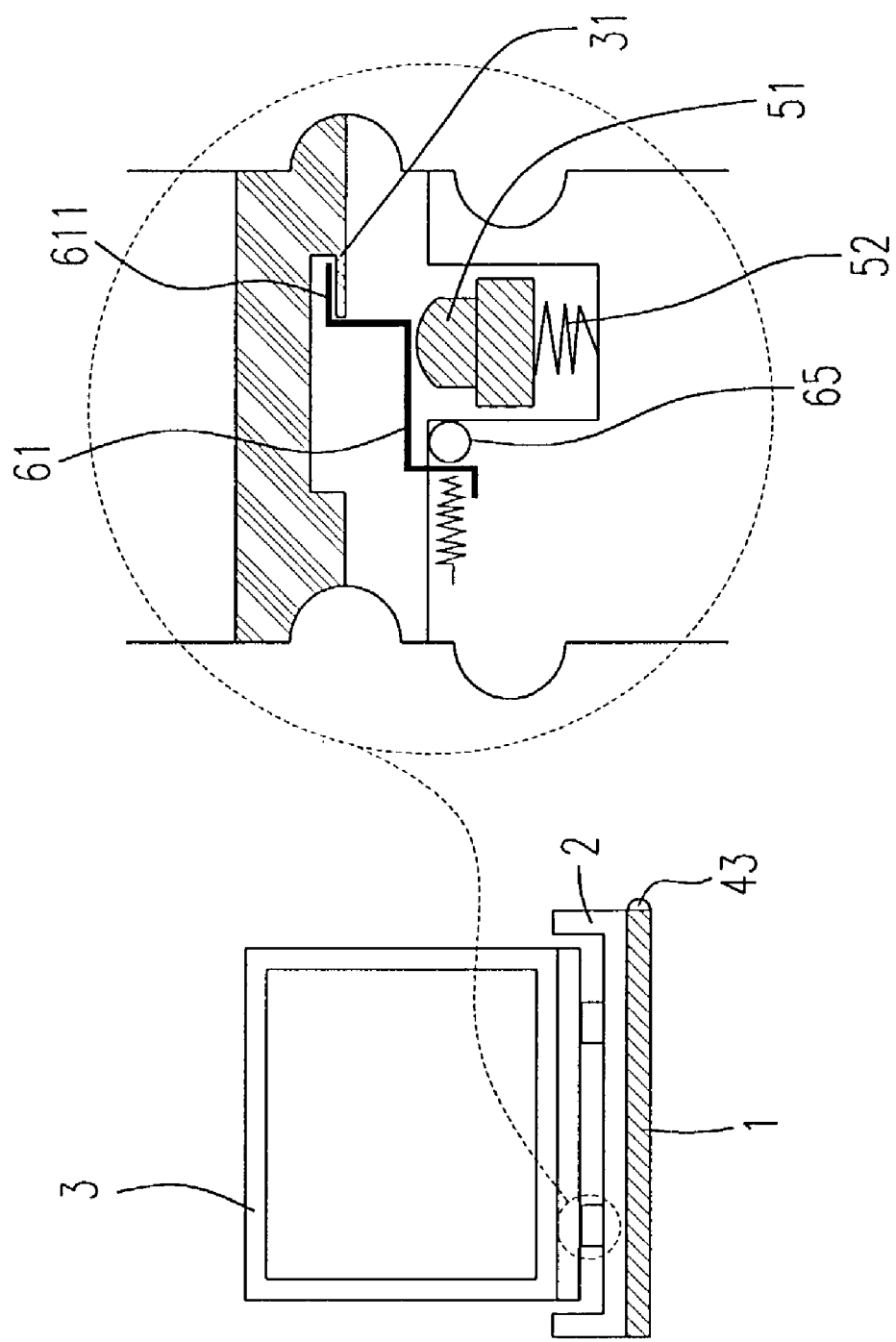
FIG. 2 shows a side view of the connection between a notebook PC and a port replicator according to a preferred embodiment of the present invention.

Please refer to FIG. 2 showing a side view of the connection between a notebook PC and a port replicator. As shown in FIG. 2, the ejecting pin 51 will be pressed down by the weight of the notebook PC 3 while the notebook PC 3 is located on the removable cover 2. Without limit from ejecting pin 51, the latch end 611 will be combined to a latch notch 31 of the notebook PC 3 via a wheel 65, and the notebook PC 3 is be stabilized by the port replicator PR. On the other hand, the ejecting pin 51 will be blocked by the latch end 611 of the mobile latch 61 and cannot be back to the original state before being pushed.

Figure 3:
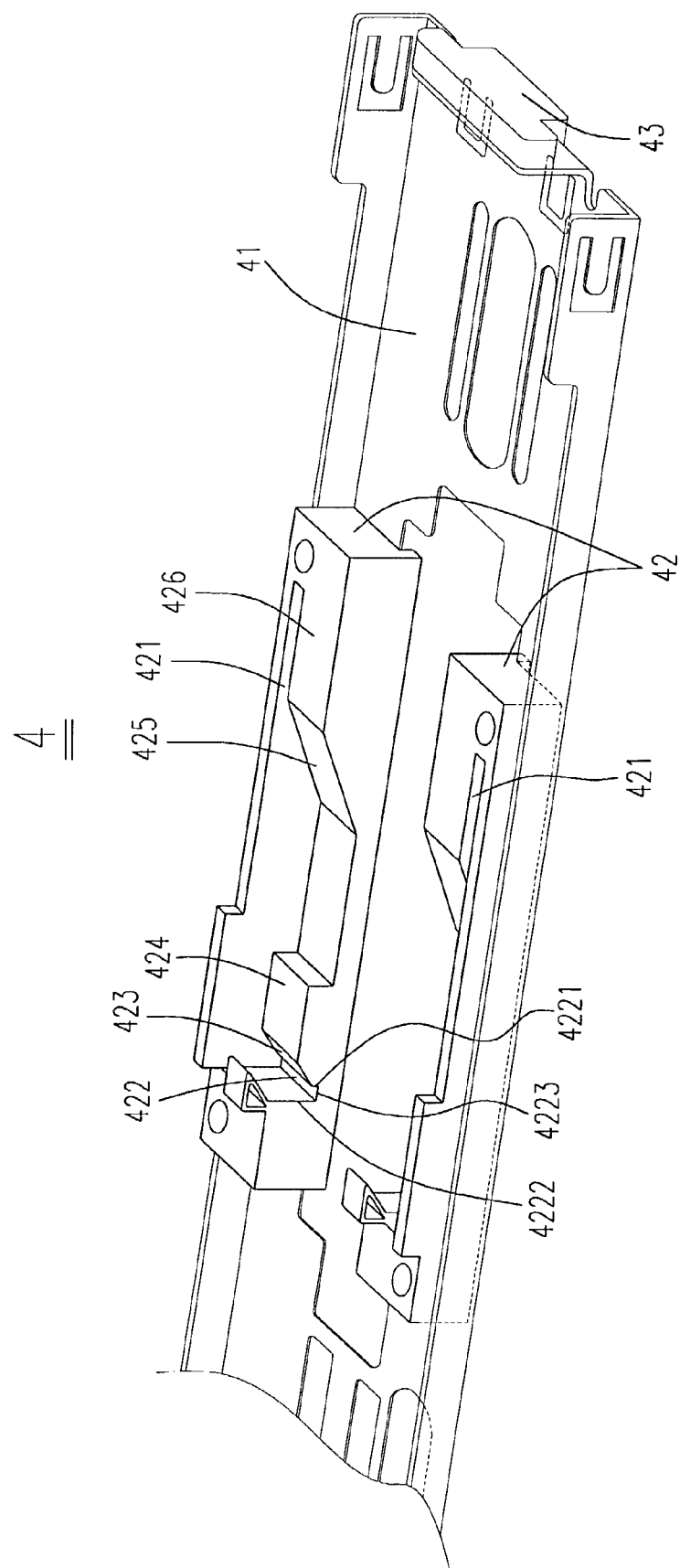
FIG. 3 shows a structural diagram of the reciprocating device according to a preferred embodiment of the present invention.

Please refer to FIG. 3 showing a structural diagram of the reciprocating device according to a preferred embodiment of the present invention. As shown in FIG. 3, a reciprocating device 4 includes a reciprocating plate 41 and a reciprocating base 42, which is fixed on the reciprocating plate 41 and includes two symmetrical portions. Each of the symmetrical portions has the same moving structures, which include a track 421, a roller notch 422, a first incline 423, a first reciprocating plane 424, a second incline 425, and a second reciprocating plane 426. The roller notch 422 is composed of a first push plane 4221, a second push plane 4222, and a holding plane 4223.

Figure 4:
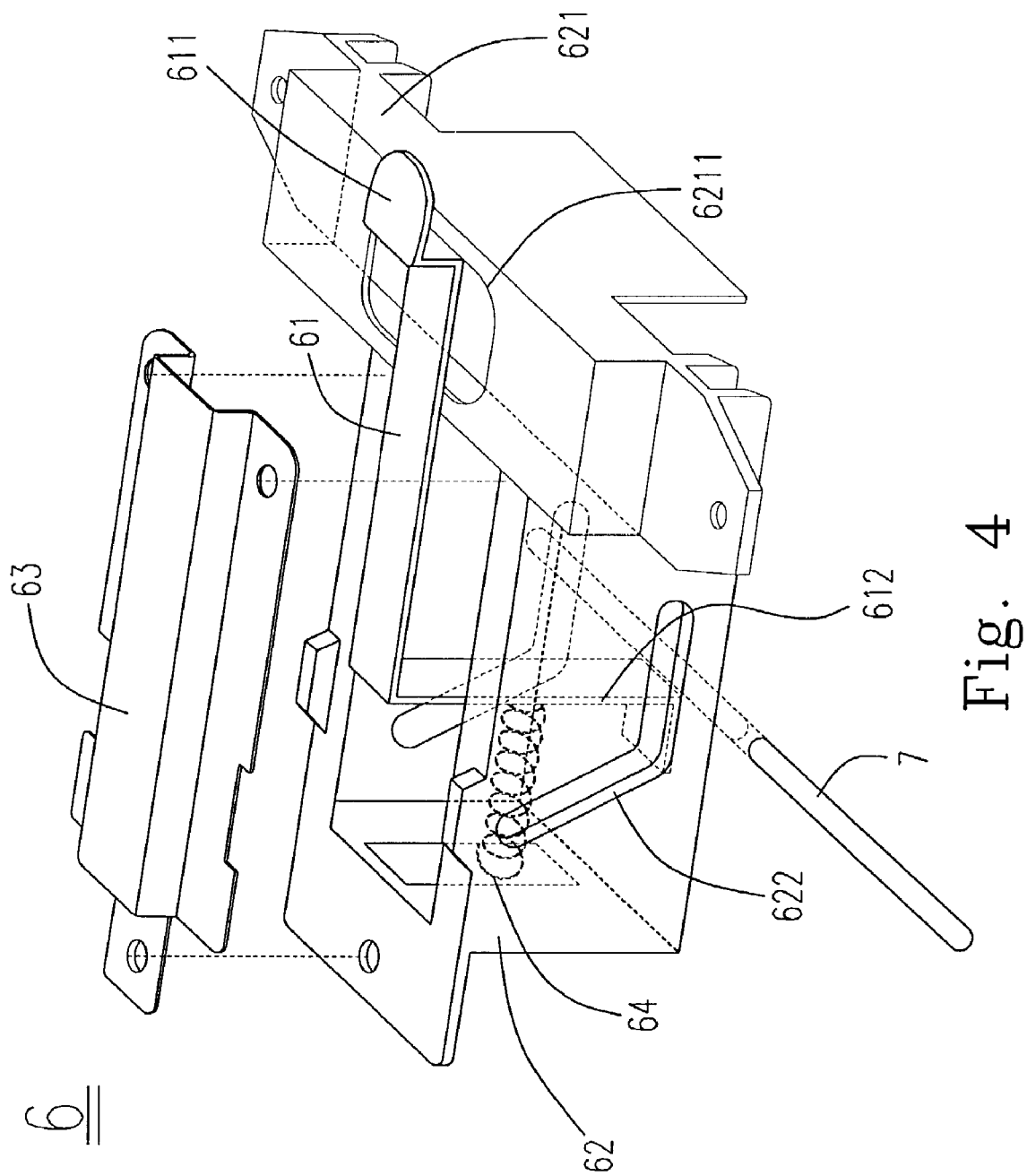
FIG. 4 shows a structural diagram of the stabilizing device according to a preferred embodiment of the present invention.

Please refer to FIG. 4 showing the structural diagram of the stabilizing device according to a preferred embodiment of the present invention. As shown in FIG. 4, the stabilizing device 6 includes a mobile latch 61, a stabilizing base 62, a rigid cover 63, and a latch spring 64. Two ends of the mobile latch 61 are the latch end 611 and the stabilizing end 612 respectively. The stabilizing base 62 further includes a beam 621 with a hole 6211, wherein the hole 6211 can be passed through by the ejecting pin 51 (as show in FIG. 1). The cover 63 needs to be fixed on the stabilizing base 62 for ensuring the mobile latch 61 working normally. In addition, a roller 7 is located into the inclined roller track 622, and the stabilizing end 612 of the mobile latch 62 is located between the latch spring 64 and the roller 7.

Figure 5:
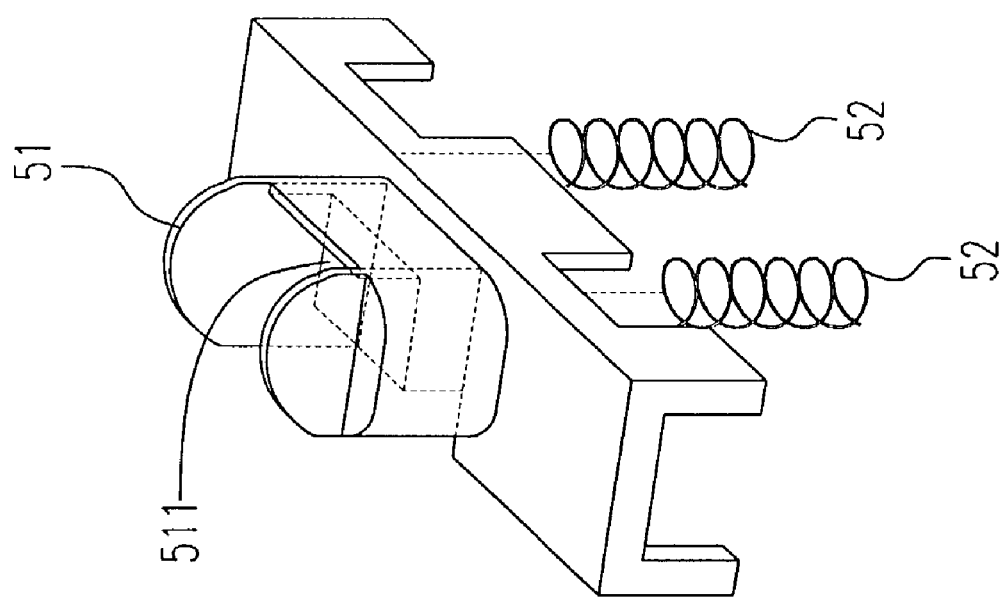
FIG. 5 shows a structural diagram of the prop device according to a preferred embodiment of the present invention.

Please refer to FIG. 5 showing a structural diagram of the prop device according to a preferred embodiment of the present invention. As shown in FIG. 5, a prop device 5 is composed of an ejecting pin 51, two ejecting springs 52, and a latch holder 511.

Figure 6:
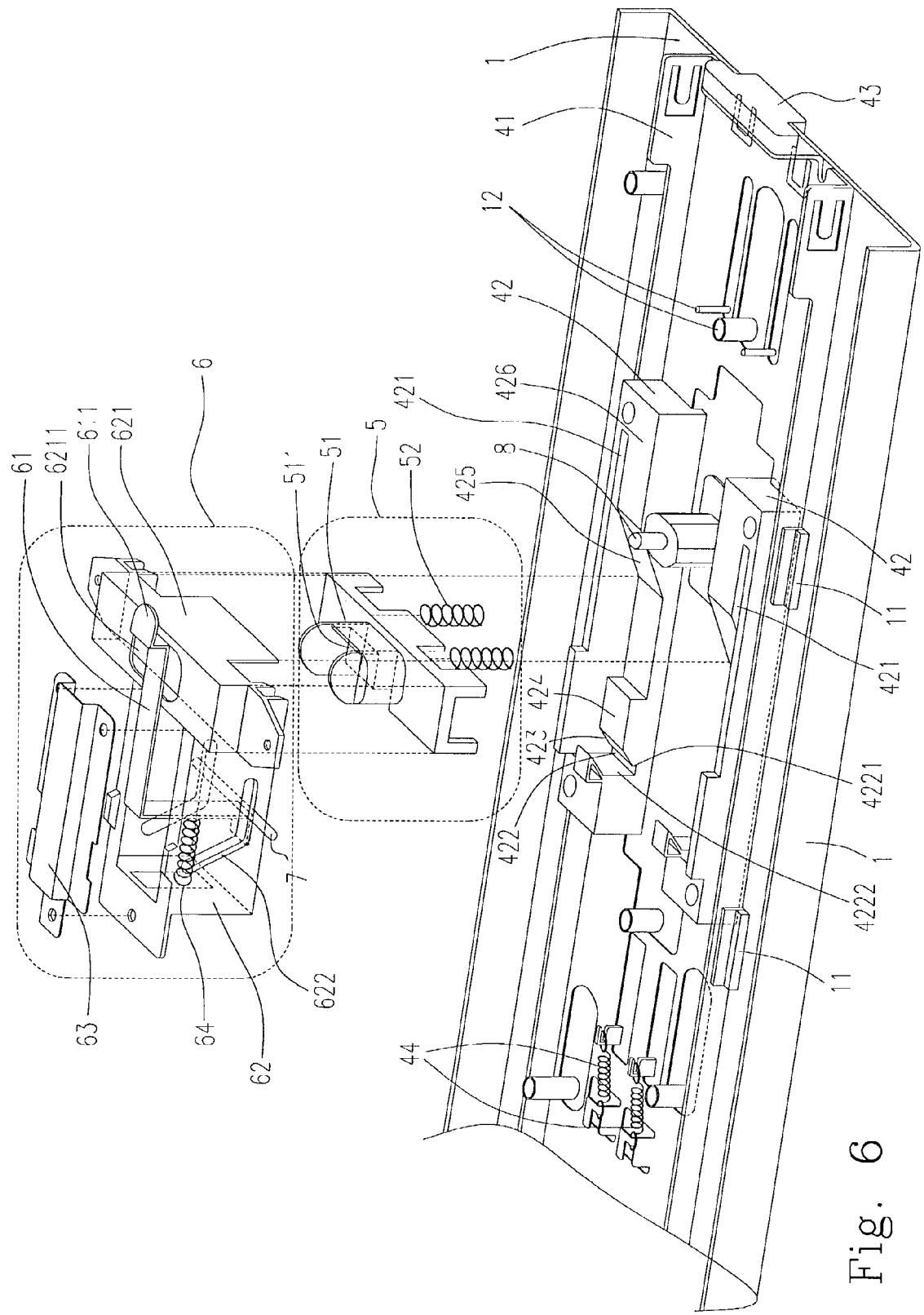
FIGS. 6 shows a schematic diagram of combining the reciprocating device, the prop device, the stabilizing device and the base according to a preferred embodiment of the present invention.

Please refer to FIG. 6. FIG. 6 shows the assembly of the reciprocating device, the prop device, the stabilizing device, and the base according to a preferred embodiment of the present invention.

Figure 7:
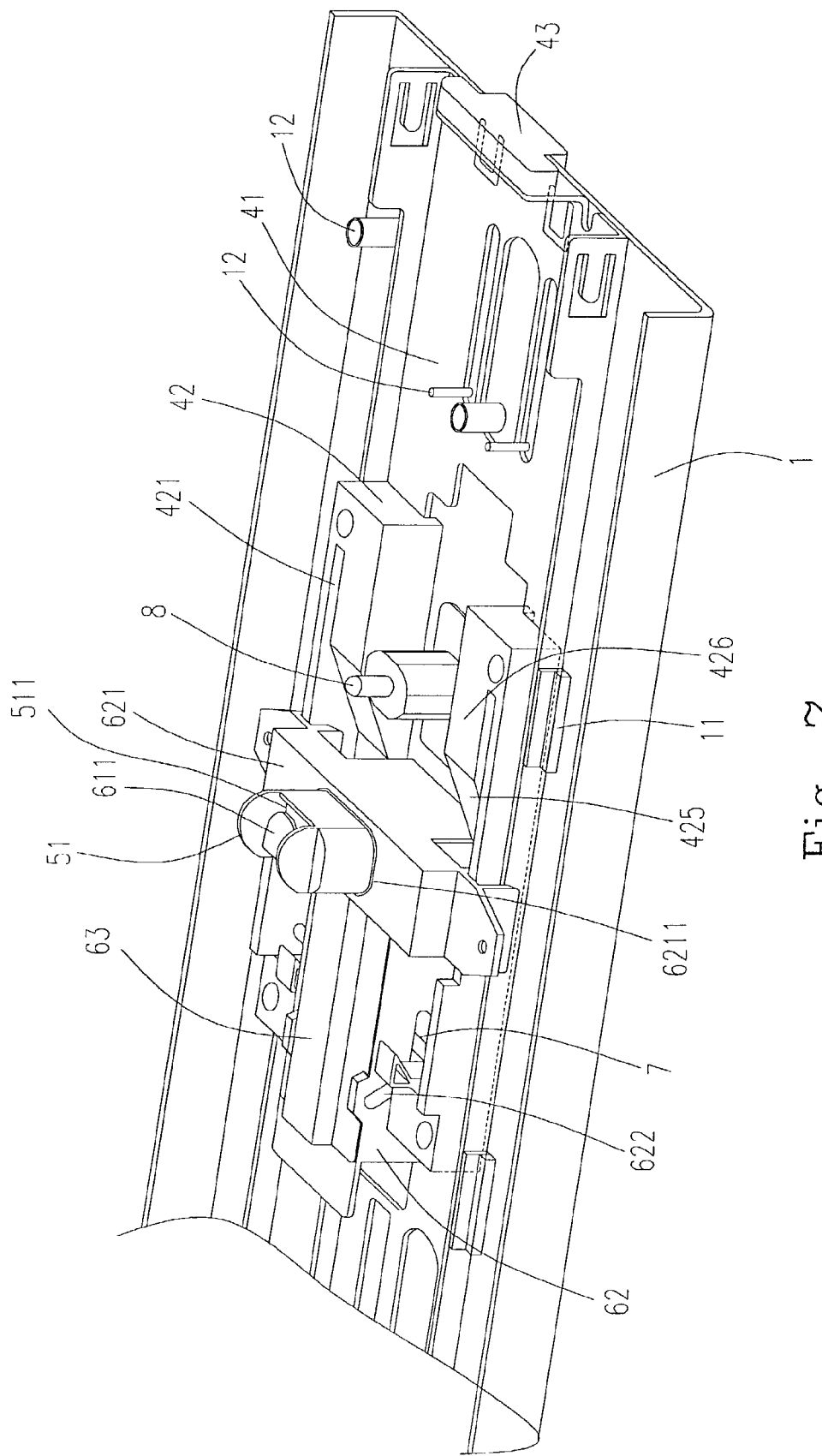
FIG. 7 shows a combination diagram of the reciprocating device, the prop device, the stabilizing device and the base according to a preferred embodiment of the present invention.

Please refer to FIG. 7. FIG. 7 shows a combination diagram of the reciprocating device, the prop device, the stabilizing device, and the base according to a preferred embodiment of the present invention.

As shown in FIGS. 6 and 7, the stabilizing base 62 needs to be fixed on the reciprocating plate 41 first. Before the stabilizing base 62 being fixed, it needs to be sure that the roller 7 is located into the roller notch 422 of the reciprocating base 42, the beam 621 needs to be stretched over the track 421, and the hole 6211 can be passed through by the ejecting pin 51. Because the latch end 611 will be blocked by the latch holder 511, the action of the mobile latch 61 will be controlled by the latch holder 511 of the ejecting pin 51. The protruding pillars 12 are fixed on the base 1 for supporting the removable cover 2 (As shown in FIG. 1), and the protruding lumps 11 are fixed on the base 1 for maintaining the moving scopes of the reciprocating plate 41.

Please refer to FIGS. 1, 4, 5, and 6. The port replicator PR indeed includes a pair of prop devices 5 and a pair of stabilizing devices 6. Because the mechanisms of the two prop devices 5 or the mechanisms of the stabilizing devices 6 are all the same, that the following descriptions of the action mechanisms about the prop device 5 and stabilizing device 6 are merely dependent on one device of each pair, respectively. Please refer to FIG. 7. During a releasing procedure, the key 43 will be pushed for sequentially forming two stage key displacements, the first key displacement and the second key displacement, by a two-stage force. By the time, two correspondingly reciprocating base displacements, the first reciprocating base displacement and the second reciprocating base displacement, of the reciprocating plate 41 and the reciprocating base 42 fixed on the reciprocating plate 41 will be formed in relation with the first key displacement and the second key displacement respectively.

Please refer to FIG. 6. Because of the push of the first push plane 4221, the roller 7 will be moved in the inclined roller tracks 622 (shown in FIG. 4) and a first roller displacement is formed. During the procedure of the first roller displacement, the mobile latch 61 will be moved from the latch notch 31 (shown in FIG. 2) while the stabilizing end 612 (shown in FIG. 4) being pushed by the roller 7. Because the mobile latch 61 is moved from the latch notch 31, the notebook PC is released.

Please refer to FIG. 2. Because the mobile latch 61 is moved during the first roller displacement, the ejecting pin 51 will not be limited by the mobile latch 61. Then, the ejecting pin 51 will be pushed upward by the elasticity of the ejecting spring 52.

Please refer to FIG. 7. During the second reciprocating base displacement, the ejecting pin 51 will be moved onto the second reciprocating plane 426 via the second incline 425. By the time, the notebook PC 3 will gradually be moved upward by the support force provided by the second incline 425 and the second reciprocating plane 426 (as shown in FIGS. 2 and 7). At the moment, an action controlled by one touch operation for releasing and ejecting a notebook PC is achieved. In general, the elasticity of the ejecting pin 52 will decay as time goes, and thus it is possible the elasticity provided by the ejecting pin 52 is not strong enough for ejecting the notebook PC 3. Nowadays, the present invention provides a new design with the physical support from the second incline 425 and the second reciprocating plane 426 for overcoming the elasticity-fatigue failure.

Please refer to FIGS. 3 and 6. The roller 7 will be pushed onto the first reciprocating plane 424 via the first incline 423 while being moved in the inclined roller track 622, then the roller 7 won't be pushed by the first push plane 4221 during the second reciprocating base displacement.

Please refer to FIG. 6. Once the two-stage force is removed, a rebound movement of the reciprocating plate 41 is formed by the elasticity of the reciprocating spring 44. During the rebound movement, the ejecting pin 51 is moved back to the original position from the second reciprocating plane 426, and the roller 7 is moved back to the roller notch 422. Then, the roller 7 will be pushed back by the second push plane 4222. In addition, the mobile latch 61 will be rebounded by the elasticity of the latch spring 64. On the other hand, as the ejecting pin 52 is in an ejecting state, the moving scope of the mobile latch 61 will be restrained by the latch holder 511. At the moment, the whole action of releasing and ejecting is finished.

As above-mentioned, the present invention provides a release apparatus controlled by one touch operation. It solves kinds of problems appeared in the conventional fabrication procedure of components. For example, the problems of time-consuming and manpower-consuming caused by pushing all the controlling buttons simultaneously and equally will be solved easily by the present invention. Even more, the present invention provides a design with support force from inclines and planes for solving the problem of the elasticity fatigue of the spring as time goes. Things like that, effectively improving the defaults of the prior arts and being worthy for the industries are the purposes of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A release apparatus controlled by one touch operation, comprising:
   a base;
   a prop device having a resilient member located between said base and an ejecting pin;
   a reciprocating device located between said base and said prop device and having a reciprocating piece and a reciprocating base fixed on said reciprocating piece; and
   a stabilizing device fixed on said base and having a stabilizing base and a movable piece for limiting said ejecting pin of said prop device.

2. The apparatus as claimed in claim 1, wherein said base comprises a plurality of protruding pillars having different lengths and a plurality of protruding lumps for limiting said reciprocating device to be moved in a moving track.

3. The apparatus as claimed in claim 1, wherein said movable piece is a movable latch and said ejecting pin has a holder for limiting said movable latch.

4. The apparatus as claimed in claim 3, wherein said movable latch further comprises a latch end connected to said ejecting pin, and a stabilizing end located between said roller and a latch spring inside said stabilizing base.

5. The apparatus as claimed in claim 4 further comprising at least a reciprocating spring connected to said reciprocating piece, a roller located on a pair of inclined roller tracks on said stabilizing base, and a key for bearing said one touch operation.

6. The apparatus as claimed in claim 5, wherein said key is moved by said one touch operation for producing a first key displacement and a second key displacement respectively so as to move said reciprocating base and produce a first reciprocating base displacement and a second reciprocating base displacement at the same direction correspondingly.

7. The apparatus as claimed in claim 6, wherein said reciprocating base further comprises two symmetrical portions, and each of said two symmetrical portions has a track, a roller notch, a first incline located between said roller notch and a first reciprocating plane thereof, and a second incline connected to a second reciprocating plane thereof.

8. The apparatus as claimed in claim 7, wherein said ejecting pin is moved along said second incline to said second reciprocating plane during said second reciprocating base displacement.

9. The apparatus as claimed in claim 7, wherein said roller notch comprises a first stopping plane, a second stopping plane, and a holding plane.

10. The apparatus as claimed in claim 9, wherein said roller is pushed by said first stopping plane so as to be moved in said roller track and produce a roller displacement during said first reciprocating base displacement.

11. The apparatus as claimed in claim 10, wherein said movable latch is moved by said roller during said roller displacement so as to produce a first latch displacement simultaneously.

12. The apparatus as claimed in claim 11, wherein said resilient member is an ejecting spring and said ejecting pin is pushed up by said ejecting spring after said first latch displacement.

13. The apparatus as claimed in claim 1, wherein said stabilizing base further comprises a beam with a hole and said hole is passed through by said ejecting pin.

14. The apparatus as claimed in claim 1, wherein said stabilizing base further comprises a rigid cover for limiting a moving scope of said movable piece.

15. A port replicator controlled by one touch operation for releasing and ejecting a notebook PC, comprising:
    a base having a plurality of prop devices, wherein each of said plurality of prop devices has a holder and is connected to said base via a spring;
    a plurality of conducting terminals located on said base respectively;
    a reciprocating device being located between said base and said plurality of prop devices and comprising a plurality of reciprocating bases, wherein each of said plurality of reciprocating bases has at least a reciprocating piece;
    a plurality of stabilizing devices fixed on said base, wherein each of said plurality of stabilizing devices respectively comprises a movable piece for limiting said holder; and
    a removable cover combined on said base corresponding to positions of said plurality of prop devices and said plurality of electrical contactors for carrying thereon said notebook PC.

16. The port replicator as claimed in claim 15, wherein said movable piece is a movable latch with a latch end and a stabilizing end.

17. The port replicator as claimed in claim 16, wherein said latch end and said holder are engaged with each other.

18. The port replicator as claimed in claim 15, wherein said reciprocating piece supports said ejecting pin while said ejecting pin being on said reciprocating plane.

19. The port replicator as claimed in claim 15, wherein said movable piece is a stair-shaped latch.

* * * * *